US012566269B2

(12) United States Patent
Chiu et al.

(10) Patent No.: US 12,566,269 B2
(45) Date of Patent: Mar. 3, 2026

(54) MOBILE ROBOT GENERATING RESIZED REGION OF INTEREST IN IMAGE FRAME AND USING DUAL-BANDPASS FILTER

(71) Applicant: PixArt Imaging Inc., Hsin-Chu County (TW)

(72) Inventors: Mian-Jhong Chiu, Hsin-Chu County (TW); Guo-Zhen Wang, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 1090 days.

(21) Appl. No.: 17/533,585

(22) Filed: Nov. 23, 2021

(65) Prior Publication Data

US 2022/0091265 A1     Mar. 24, 2022

Related U.S. Application Data

(60) Continuation-in-part of application No. 17/342,044, filed on Jun. 8, 2021, now Pat. No. 11,821,985, and
(Continued)

(51) Int. Cl.
*G01S 17/66*     (2006.01)
*G01S 7/48*     (2006.01)
(Continued)

(52) U.S. Cl.
CPC ............ *G01S 17/66* (2013.01); *G01S 7/4808* (2013.01); *G01S 7/4815* (2013.01);
(Continued)

(58) Field of Classification Search
CPC .......... G01S 17/66; G01S 17/50; G01S 17/08; G01S 17/48; G01S 17/46; G01S 7/4808;
(Continued)

(56) References Cited

U.S. PATENT DOCUMENTS

| | | | |
|---|---|---|---|
| 4,954,962 A | 9/1990 | Evans, Jr. et al. | |
| 5,247,173 A | 9/1993 | Benchetrit et al. | |
(Continued)

FOREIGN PATENT DOCUMENTS

| | | |
|---|---|---|
| CN | 103034342 A | 4/2013 |
| CN | 105988596 A | 10/2016 |
| CN | 111035321 A | 4/2020 |

OTHER PUBLICATIONS

Apostolopoulos et al., "Mobile Robot for Automatic Installation of Floor Tiles", Apr. 1996, IEEE, International Conference on Robotics and Automation Minneapolis, Minnesota, pp. 3652-3657(Year: 1996).

*Primary Examiner* — Nhi Q Bui
(74) *Attorney, Agent, or Firm* — WPAT, PC

(57)     ABSTRACT
There is provided a mobile robot that performs the obstacle avoidance, positioning and object recognition according to image frames captured by the same optical sensor. The mobile robot includes an optical sensor, a light emitting diode, a laser diode and a processor. The processor identifies an obstacle and a distance thereof according to image frames captured by the optical sensor when the laser diode is emitting light. The processor further performs the positioning and object recognition according to image frames captured by the optical sensor when the light emitting diode is emitting light.

25 Claims, 12 Drawing Sheets

Related U.S. Application Data a continuation-in-part of application No. 17/185,263, filed on Feb. 25, 2021, now Pat. No. 11,307,308, and a continuation-in-part of application No. 17/064,776, filed on Oct. 7, 2020, now Pat. No. 11,752,635, which is a continuation-in-part of application No. 16/929,232, filed on Jul. 15, 2020, now Pat. No. 11,691,264, said application No. 17/342,044 is a continuation-in-part of application No. 16/929,232, filed on Jul. 15, 2020, now Pat. No. 11,691,264, said application No. 17/185,263 is a division of application No. 16/800,187, filed on Feb. 25, 2020, now Pat. No. 10,962,646, said application No. 16/929,232 is a continuation-in-part of application No. 16/425,955, filed on May 30, 2019, now Pat. No. 11,510,539, said application No. 16/800,187 is a continuation of application No. 15/841,376, filed on Dec. 14, 2017, now Pat. No. 10,627,518, said application No. 16/425,955 is a continuation-in-part of application No. 15/841,376, filed on Dec. 14, 2017, now Pat. No. 10,627,518.

(60) Provisional application No. 62/514,349, filed on Jun. 2, 2017.

(51) Int. Cl.

| | |
|---|---|
| *G01S 7/481* | (2006.01) |
| *G01S 17/46* | (2006.01) |
| *G01S 17/50* | (2006.01) |
| *G06T 7/521* | (2017.01) |
| *G06V 10/25* | (2022.01) |
| *H04N 23/20* | (2023.01) |
| *H04N 23/51* | (2023.01) |
| *H04N 23/56* | (2023.01) |
| *G01S 17/08* | (2006.01) |
| *G01S 17/48* | (2006.01) |

(52) U.S. Cl.
CPC ............ *G01S 7/4816* (2013.01); *G01S 17/46* (2013.01); *G01S 17/50* (2013.01); *G06T 7/521* (2017.01); *G06V 10/25* (2022.01); *H04N 23/20* (2023.01); *H04N 23/51* (2023.01); *H04N 23/56* (2023.01); *G01S 17/08* (2013.01); *G01S 17/48* (2013.01); *G06T 2207/10004* (2013.01); *G06T 2207/10152* (2013.01)

(58) Field of Classification Search
CPC ..... G01S 7/4815; G01S 7/4816; G06T 7/521; G06T 2207/10004; G06T 2207/10152; G06V 10/25; H04N 23/51; H04N 23/56; H04N 5/33
See application file for complete search history.

(56) References Cited

U.S. PATENT DOCUMENTS

| | | | |
|---|---|---|---|
| 10,611,023 | B2 | 4/2020 | Fong et al. |
| 2002/0085116 | A1 | 7/2002 | Kuwano et al. |
| 2004/0212805 | A1 | 10/2004 | Wang et al. |
| 2008/0018602 | A1 | 1/2008 | Cheng et al. |
| 2008/0260262 | A1 | 10/2008 | Lim et al. |
| 2009/0146044 | A1 | 6/2009 | Chen et al. |
| 2011/0176709 | A1 | 7/2011 | Park et al. |
| 2012/0019677 | A1 | 1/2012 | Wong et al. |
| 2013/0072771 | A1 | 3/2013 | Gu et al. |
| 2013/0127714 | A1 | 5/2013 | Gu et al. |
| 2013/0127721 | A1 | 5/2013 | Gu et al. |
| 2013/0127722 | A1 | 5/2013 | Gu et al. |
| 2013/0131474 | A1 | 5/2013 | Gu et al. |
| 2013/0138247 | A1 | 5/2013 | Gutmann et al. |
| 2013/0184865 | A1 | 7/2013 | Guo et al. |
| 2013/0215257 | A1 | 8/2013 | Huang et al. |
| 2014/0323835 | A1 | 10/2014 | Kao |
| 2015/0009146 | A1 | 1/2015 | Song |
| 2015/0168954 | A1 | 6/2015 | Hickerson et al. |
| 2016/0119747 | A1 | 4/2016 | Ryan et al. |
| 2016/0238773 | A1 | 8/2016 | Shei et al. |
| 2016/0288330 | A1 | 10/2016 | Konolige |
| 2016/0306446 | A1 | 10/2016 | Chung et al. |
| 2016/0345847 | A1 | 12/2016 | Gu et al. |
| 2017/0061226 | A1 | 3/2017 | Kok et al. |
| 2017/0076442 | A1 | 3/2017 | Schoenmeyer et al. |
| 2017/0076521 | A1 | 3/2017 | Chuang et al. |
| 2017/0371856 | A1* | 12/2017 | Can .................. G06V 30/19173 |
| 2018/0196512 | A1* | 7/2018 | Kim ..................... G06F 1/1637 |
| 2018/0210445 | A1* | 7/2018 | Choi ................... G05D 1/0238 |
| 2018/0270445 | A1* | 9/2018 | Khandelwal .......... G06V 20/49 |
| 2019/0113606 | A1 | 4/2019 | Mathy et al. |
| 2019/0320867 | A1* | 10/2019 | Noh ........................... B25J 9/16 |
| 2020/0241550 | A1 | 7/2020 | Lin et al. |

* cited by examiner

MOBILE ROBOT GENERATING RESIZED REGION OF INTEREST IN IMAGE FRAME AND USING DUAL-BANDPASS FILTER

RELATED APPLICATIONS

The present application is a continuation-in-part application of U.S. patent application Ser. No. 17/064,776 filed on Oct. 7, 2020, which is a continuation-in-part application of U.S. patent application Ser. No. 16/929,232 filed on Jul. 15, 2020, which is a continuation-in-part application of U.S. patent application Ser. No. 16/425,955 filed on May 30, 2019, which is a continuation-in-part application of U.S. patent application Ser. No. 15/841,376 filed on Dec. 14, 2017, which claims the priority benefit of U.S. Provisional Application Ser. No. 62/514,349, filed on Jun. 2, 2017, the disclosures of which are hereby incorporated by reference herein in their entirety.

The present application is also a continuation-in-part application of U.S. patent application Ser. No. 17/342,044 filed on Jun. 8, 2021, which is a continuation-in-part application of U.S. patent application Ser. No. 16/929,232 filed on Jul. 15, 2020, which is a continuation-in-part application of U.S. patent application Ser. No. 16/425,955 filed on May 30, 2019, which is a continuation-in-part application of U.S. patent application Ser. No. 15/841,376 filed on Dec. 14, 2017, which claims the priority benefit of U.S. Provisional Application Ser. No. 62/514,349, filed on Jun. 2, 2017, the disclosures of which are hereby incorporated by reference herein in their entirety.

The present application is also a continuation-in-part application of U.S. patent application Ser. No. 17/185,263 filed on Feb. 25, 2021, which is a divisional application of U.S. patent application Ser. No. 16/800,187 filed on Feb. 25, 2020, which is a continuation application of U.S. patent application Ser. No. 15/841,376 filed on Dec. 14, 2017, which claims the priority benefit of U.S. Provisional Application Ser. No. 62/514,349, filed on Jun. 2, 2017, the disclosures of which are hereby incorporated by reference herein in their entirety.

BACKGROUND

1. Field of the Disclosure

This disclosure generally relates to a mobile robot and, more particularly, to a mobile robot that performs the obstacle avoidance, positioning and object recognition according to image frames captured by the same optical sensor corresponding to lighting of different light sources.

2. Description of the Related Art

The smart home is one part of developing a smart city, and a cleaning robot has almost become one standard electronic product in a smart home. Generally, the cleaning robot is arranged with multiple functions to improve the user experience, e.g., including mapping of an operation area, obstacle detection and avoidance during operation. The current cleaning robot is employed with multiple types of sensors to perform these different detecting functions.

For example, the cleaning robot includes a sensor arranged at a top surface thereof to implement the visual simultaneous localization and mapping (VSLAM) by capturing images above the path by which the cleaning robot passes. In addition, the cleaning robot further adopts a front sensor to implement the obstacle detection and avoidance by capturing images in front of a moving direction of the mobile robot.

That is, the conventional cleaning robot needs multiple sensors to perform different detecting functions.

Accordingly, the present disclosure provides a mobile robot that performs the obstacle avoidance, positioning and object recognition according to the image frames captured by the same one optical sensor corresponding to lighting of different light sources.

SUMMARY

The present disclosure provides a mobile robot that performs the obstacle avoidance according to the image frame captured by an optical sensor when a laser diode is emitting light, and performs the visual simultaneous localization and mapping (VSLAM) according to the image frame captured by the optical sensor when a light emitting diode is emitting light.

The present disclosure further provides a mobile robot that determines a region of interest according to the image frame captured by an optical sensor when a laser diode is emitting light, and performs the object recognition in the region of interest of the image frame captured by the optical sensor when a light emitting diode is emitting light to reduce the computation loading and power consumption as well as improve the recognition correctness.

The present disclosure provides a mobile robot including an optical sensor and a processor. The optical sensor is configured to capture an image frame. The processor is electrically coupled to the optical sensor, and configured to determine a region of interest (ROI) in the image frame, extend a size of the ROI from an edge of the ROI to an integer times of a predetermined size to obtain an extended ROI, and resize the extended ROI to the predetermined size.

The present disclosure further provides a mobile robot including an optical sensor and a processor. The optical sensor is configured to capture an image frame. The processor is electrically coupled to the optical sensor, and configured to determine a region of interest (ROI) in the image frame, and extend a size of the ROI from an edge of the ROI to an integer times of a predetermined size to obtain an extended ROI.

The present disclosure further provides a mobile robot including an optical sensor and a processor. The optical sensor is configured to capture an image frame. The processor is electrically coupled to the optical sensor, and configured to determine a region of interest (ROI) in the image frame, calculate a ratio of a size of the ROI with respect to a predetermined size which is smaller than the size of the ROI, and sample the ROI to resize the ROI to the predetermined size. The predetermined size is N×M, a first ratio in an N-size direction is an integer p, a second ratio in an M-size direction is an integer q, and the processor is configured to sample one pixel every p pixels in the N-size direction, and sample one pixel every q pixels in the M-size direction.

The present disclosure further provides a mobile robot including a linear light source, an optical sensor, a dual-bandpass filter and a processor. The linear light source is configured to project a linear light section toward a moving direction of the mobile robot. The optical sensor is configured to capture a bright image frame when the linear light source is turned on and a dark image frame when the linear light source is turned off. The dual-bandpass filter is arranged at a light incident path of the optical sensor. The processor is electronically coupled to the linear light source and the optical sensor, and configured to calculate a differential image frame between the bright image frame and dark image frame, perform range estimation using the differential image frame; and perform visual simultaneous localization and mapping (VSLAM) or image recognition using the dark image frame or another dark image frame captured by the optical sensor.

In the present disclosure, the mobile robot realizes multiple detecting functions by using a single optical sensor incorporating with different light sources activating at different times.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The mobile robot of the present disclosure is to operate using a single optical sensor incorporating with different light sources. The linear light source is used to find an obstacle and measure a distance of the obstacle as a reference for turning a moving direction of the robot. The illumination light source is used to illuminate a front area for the visual simultaneous localization and mapping (VSLAM) and the object recognition.

Figure 1A:
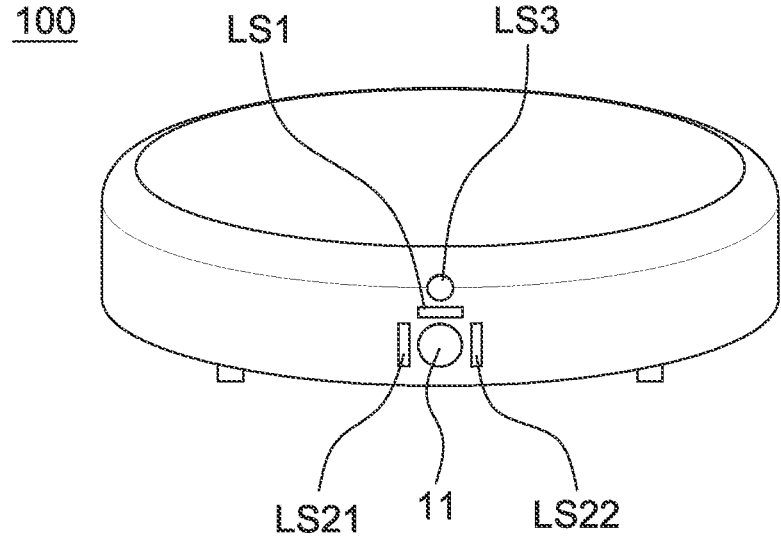
FIG. 1A is a schematic diagram of a mobile robot according to one embodiment of the present disclosure.

Referring to FIG. 1A, it is a schematic diagram of a mobile robot 100 according to one embodiment of the present disclosure. FIG. 1A shows that the mobile robot 100 is a cleaning robot, but the present disclosure is not limited thereto. The mobile robot 100 is any electronic robot that moves according to the imaging result to perform the transportation, communication and guiding.

Figure 1B:
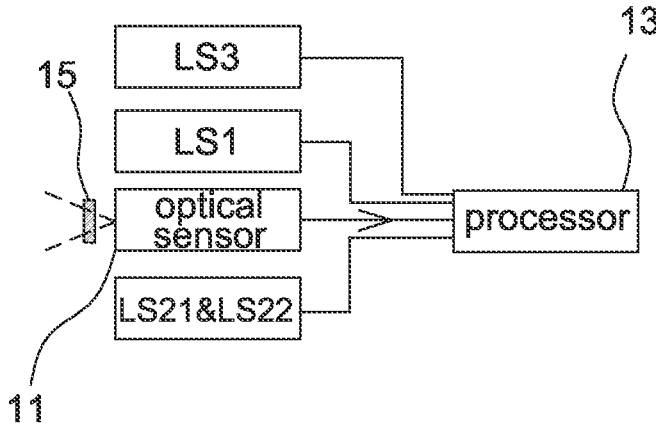
FIG. 1B is a schematic block diagram of elements of a mobile robot according to one embodiment of the present disclosure.

Please referring to FIG. 1B together, it is a schematic block diagram of a mobile robot 100 according to one embodiment of the present disclosure. The mobile robot 100 includes a first light source LS1, second light sources LS21 and LS22, a third light source LS3, an optical sensor 11 and a processor 13. The processor 13 is an application specific integrated circuit (ASIC) or a micro controller unit (MCU) that implements its functions using software, hardware and/or firmware. Although FIG. 1B shows two second light sources, it is only intended to illustrate but not to limit the present disclosure. The mobile robot 100 may include only one second light source.

The first light source LS1 includes, for example, a laser light source and a diffractive optical element. The diffractive optical element causes light emitted by the laser light source to generate a transverse projecting light after passing thereby such that the first light source LS1 projects a transverse light section toward a moving direction. The moving direction is along a side arranging the first light source LS1, the second light sources LS21 and LS22, the third light source LS3 and the optical sensor 11.

The second light sources LS21 and LS22 respectively include, for example, a laser light source and a diffractive optical element. The diffractive optical element causes light emitted by the laser light source to generate a longitudinal projecting light after passing thereby such that the second light sources LS21 and LS22 respectively project a longitudinal light section toward the moving direction.

In the present disclosure, the laser light source is, for example, an infrared laser diode (IR LD).

The third light source LS3 is, for example, an IR light emitting diode (LED), and used to illuminate a front area of the moving direction. An area illuminated by the third light source LS3 is preferably larger than or equal to a field of view of the optical sensor 11. In the present disclosure, when the third light source LS3 is lighted up, the first light source LS1 as well as the second light sources LS21 and LS22 are turned off.

Figure 2:
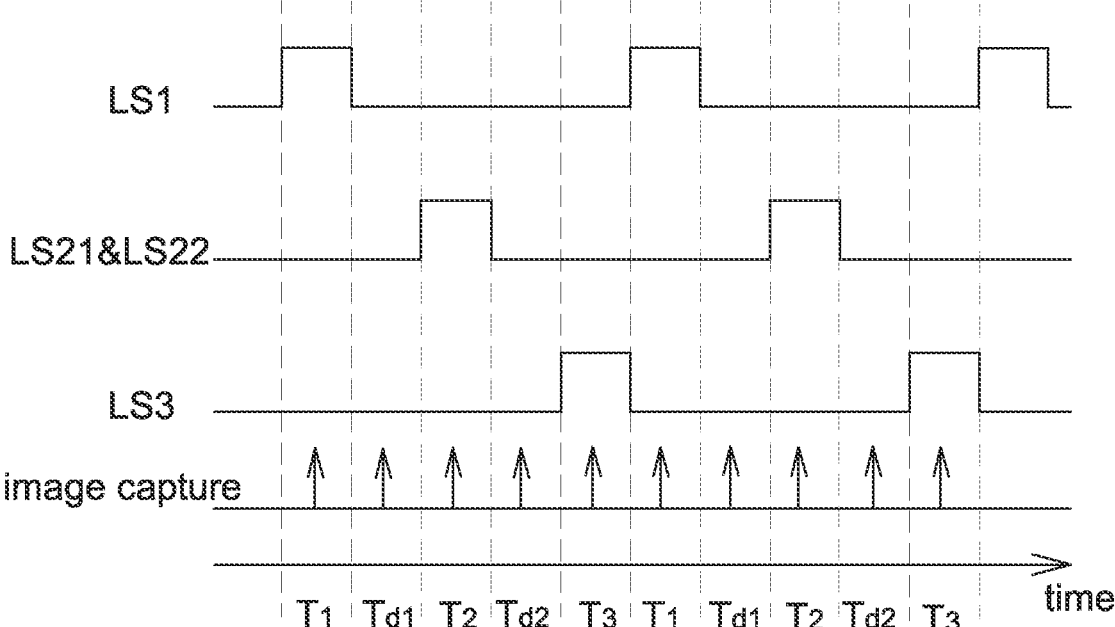
FIG. 2 is an operational timing diagram of a mobile robot according to a first embodiment of the present disclosure.

Please referring to FIG. 2, it is an operational timing diagram of a mobile robot 100 according to a first embodiment of the present disclosure. The first light source LS1 projects a transverse light section toward the moving direction at a first time interval T1. The second light sources LS1 and LS2 respectively project a longitudinal light section toward the moving direction at a second time interval T2.

The third light source LS3 illuminates a front area of the moving direction at a third time interval T3.

Figure 6A:
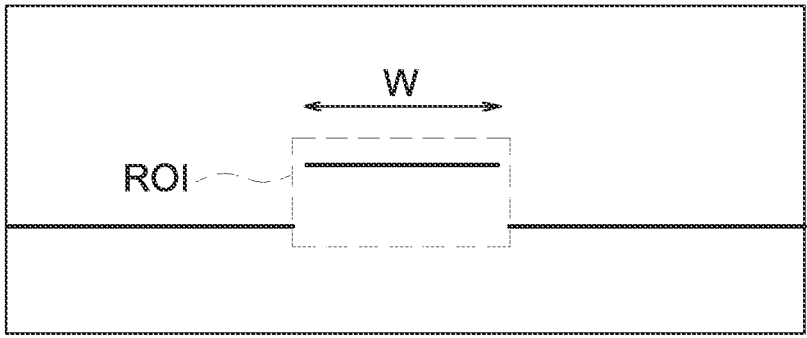
FIG. 6A is a schematic diagram of an image frame associated with a first light source and captured by an optical sensor of a mobile robot according to one embodiment of the present disclosure.
Figure 6B:
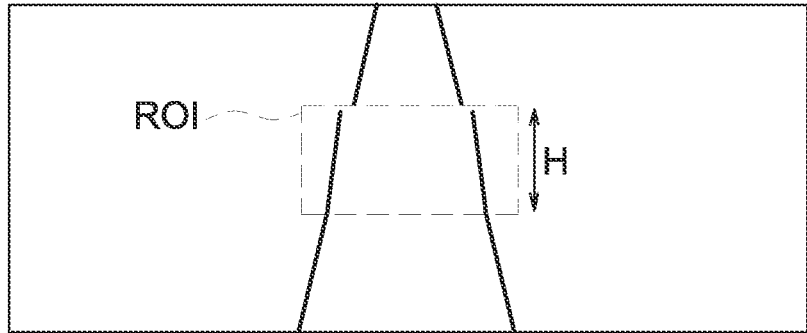
FIG. 6B is a schematic diagram of an image frame associated with a second light source and captured by an optical sensor of a mobile robot according to one embodiment of the present disclosure.

The optical sensor 11 is, for example, a CCD image sensor or a CMOS image sensor that captures a first image frame, a second image frame and a third image frame respectively within the first time interval T1, the second time interval T2 and the third time interval T3 using a sampling frequency. When the first image frame contains an obstacle, the first image frame has a broken line as shown in FIG. 6A; whereas, when the first image frame does not contain any obstacle, the first image frame only has a continuous (no broken line) transverse line. When the second image frame contains an obstacle, the second image frame has at least one broken line as shown in FIG. 6B, wherein an angle of the broken line is determined according a shape of obstacle and not limited to that shown in FIG. 6B; whereas, when the second image frame does not contain any obstacle, the second image frame only has two continuous (no broken line) tilted line. It is appreciated that FIGS. 6A and 6B are only intended to illustrate but not to limit the present disclosure.

It is appreciated that as the second light sources LS21 and LS22 project two parallel light sections on a moving surface, in the second image frame captured by the optical sensor 11, two parallel light sections present tilted lines. In addition, FIG. 6B only shows projected light sections on the moving surface captured by the optical sensor 11. When there is a wall in front of the mobile robot 100, the upper part of the second image frame will appear two parallel longitudinal light sections projected by the second light sources LS21 and LS22.

The position of broken line in the image frame reflects a position of the obstacle in front of the mobile robot 100. As long as the relationship between the position of broken line in the image frame and the actual distance of obstacles is previously recorded, a distance of one obstacle from the mobile robot 100 is obtainable when an image frame containing a broken line is captured.

As shown in FIG. 6A, the processor 13 already knows a predetermined distance from a transverse light section projected in front of the mobile robot 100 by the first light source LS1. Using the triangulation, the processor 13 calculates the distance and width of an obstacle when a broken line appears in an image of the transverse light section.

As shown in FIG. 6B, the processor 13 already knows longitudinal light sections being projected in front of the mobile robot 100 by the second light sources LS21 and LS22. Using the triangulation, the processor 13 calculates the distance and height of an obstacle according to a position and length in an image of the longitudinal light sections (i.e., tilted line) when at least one broken line appears in the image of the longitudinal light sections.

The processor 13 is electrically coupled to the first light source LS1, the second light sources LS21 and LS22, the third light source LS3 and the optical sensor 11, and used to control ON/OFF of light sources and the image capturing. The processor 13 further performs the range estimation according to the first image frame (e.g., FIG. 6A) and the second image frame (e.g., FIG. 6B), and performs the VSLAM according to the third image frame (containing object images actually being acquired), wherein details of the VSLAM are known to the art and thus are not described herein. The present disclosure is to execute different detections according to image frames captured by the same optical sensor 11 corresponding to the lighting of different light sources.

Referring to FIG. 2 again, the optical sensor 11 further captures a first dark image frame within a first dark interval Td1 of first light source behind the first time interval T1. The first dark image frame is used for differencing with the first image frame. The optical sensor 11 further captures a second dark image frame within a second dark interval Td2 of second light source behind the second time interval T2. The second dark image frame is used for differencing with the second image frame. For example, the processor 13 subtracts the first dark image frame from the first image frame, and subtracts the second dark image frame from the second image frame to eliminate background noises.

Although FIG. 2 shows that the first dark interval Td1 is behind the first time interval T1 and the second dark interval Td2 is behind the second time interval T2, the present disclosure is not limited thereto. In other aspects, the first dark interval Td1 is arranged prior to the first time interval T1 and the second dark interval Td2 is arranged prior to the second time interval T2. In another aspect, the optical sensor 11 captures only one dark image frame (e.g., prior to T1, between T1 and T2 or behind T2) within every cycle (e.g., an interval sequentially lighting every light source). The processor 13 subtracts the dark image frame from the first image frame and subtracts the dark image frame (the same one) from the second image frame. In this way, background noises are also cancelled and the total frame rate is increased.

In one aspect, the optical sensor 11 includes a pixel array. All pixels of the pixel array receive incident light via an IR light filter. For example, FIG. 1B shows that an IR pass filter 15 is further arranged in front of the optical sensor 11. The IR pass filter 15 is formed with an optics (e.g., coating on a lens) in front of the pixel array, or directly arranged upon every pixel of the pixel array.

Figure 3:
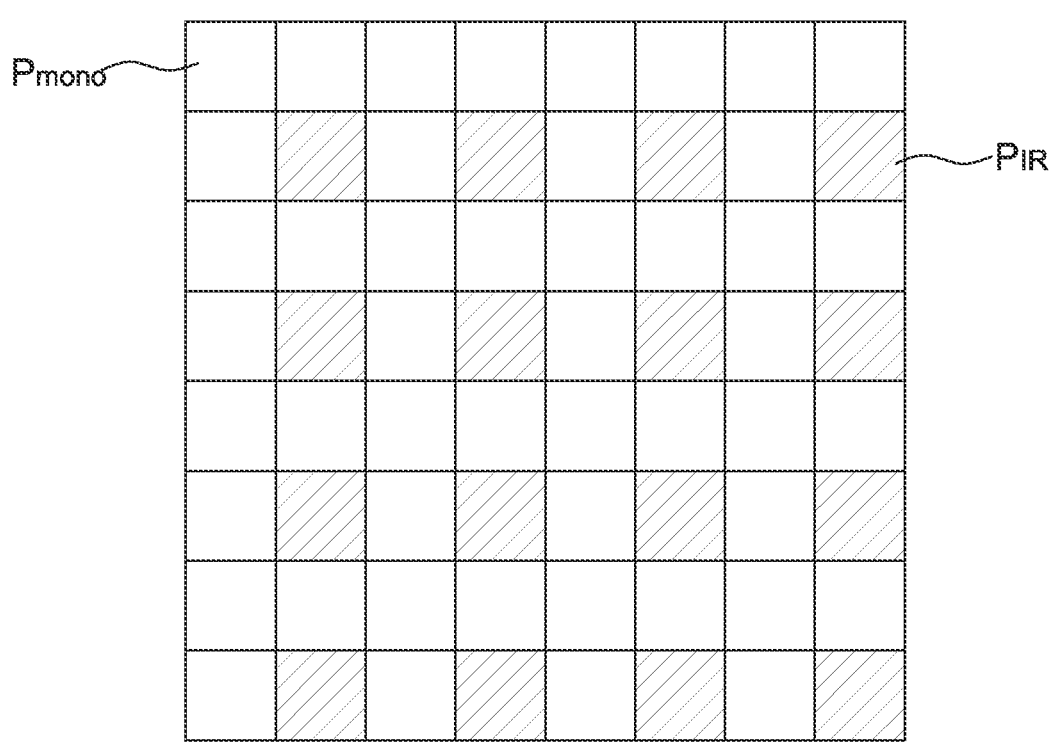
FIG. 3 is a schematic diagram of a pixel array of a mobile robot according to one embodiment of the present disclosure.

In another aspect, the pixel array of the optical sensor 11 includes a plurality of first pixels $P_{IR}$ and a plurality of second pixels $P_{mono}$, as shown in FIG. 3. The first pixels $P_{IR}$ are IR pixels, i.e. receiving incident light via a IR pass filter/film. The second pixels $P_{mono}$ receive incident light without via a IR pass filter/film. Preferably, the second pixels $P_{mono}$ receive incident light without passing any filter element. The incident light is referred to reflected light from the floor, wall and object in front of the mobile robot 100.

In the aspect including two pixel types, the first image frame and the second image frame mentioned above are formed by pixel data generated by the plurality of first pixels $P_{IR}$. That is, the processor 13 performs the range estimation only according to pixel data generated by the plurality of first pixels $P_{IR}$. The third image frame mentioned above is formed by pixel data generated by both the plurality of first pixels $P_{IR}$ and the plurality of second pixels $P_{mono}$ since the first pixels $P_{IR}$ and the second pixels $P_{mono}$ both detect infrared light when the third light source LS3 is emitting light. The processor 13 is arranged to process the pixel data corresponding to the lighting of different light sources.

In one aspect, the plurality of first pixels $P_{IR}$ and the plurality of second pixels $P_{mono}$ of the pixel array are arranged as a chessboard pattern as shown in FIG. 3. In other aspects, the first pixels $P_{IR}$ and the second pixels $P_{mono}$ are arranged in other ways, e.g., a left part or an upper part of the pixel array is arranged with the first pixels $P_{IR}$, and a right part or a lower part of the pixel array is arranged with the second pixels $P_{mono}$, but not limited thereto.

In the aspect that the first pixels $P_{IR}$ and the second pixels $P_{mono}$ are arranged in a chessboard pattern, the processor 13 further performs the pixel interpolation on the first image frame and the second image frame at first so as to fill interpolated data at positions in the first image frame and the second image frame corresponding the second pixels $P_{mono}$. After the pixel interpolation, the range estimation is performed.

When the pixel array of the optical sensor 11 is arranged as the chessboard pattern, the mobile robot 100 of the present disclosure may operate in another way to increase the frame rate of the range estimation and positioning (e.g., using VSLAM). In the aspect of FIG. 2, the frame rate of the range estimation and positioning is ⅕ of the sampling frequency of the optical sensor 11.

Figure 4:
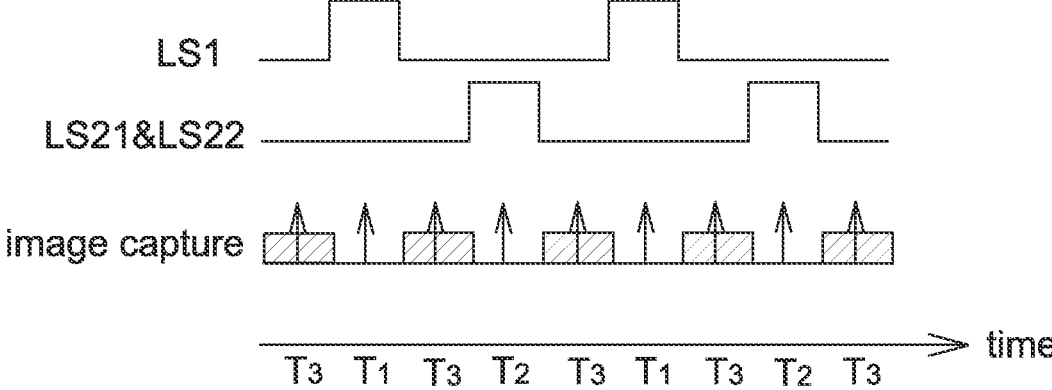
FIG. 4 is an operational timing diagram of a mobile robot according to a second embodiment of the present disclosure.

Referring to FIG. 4, it is an operational timing diagram of a mobile robot 100 according to a second embodiment of the present disclosure. The first light source LS1 projects a transverse light section toward the moving direction within a first time interval T1. The second light sources LS21 and LS22 respectively project a longitudinal light section toward the moving direction within a second time interval T2.

The pixel array of the optical sensor 11 captures a first image frame, a second image frame and a third image frame respectively within the first time interval T1, the second time interval T2 and a third time interval T3 between the first time interval T1 and the second time interval T2. That is, when the pixel array of the optical sensor 11 captures the third image frame, all light sources are not turned on. In FIG. 4, the third time interval T3 is shown by rectangular regions filled with slant lines.

The processor 13 performs the range estimation (e.g., including finding an obstacle and calculating a distance therefrom) according to the first image frame and the second image frame, wherein the first image frame and the second image frame are formed by pixel data generated by the plurality of first pixels $P_{IR}$. That is, when the first light source LS1 as well as the second light sources LS21 and LS22 are lighted up, pixel data associated with the first pixels $P_{IR}$ is not influenced by other colors of light, and thus the processor 13 is arranged to perform the range estimation according to the pixel data only associated with the plurality of first pixels $P_{IR}$.

In this embodiment, the third image frame is formed by pixel data generated by the plurality of second pixels $P_{mono}$.

Similarly, the processor 13 further performs the pixel differencing between the first image frame and the pixel data in the third image frame associated with the first pixels $P_{IR}$, and performs the pixel differencing between the second image frame and the pixel data in the third image frame associated with the first pixels $P_{IR}$ so as to eliminate background noises.

Similarly, when the first pixels $P_{IR}$ and the second pixels $P_{mono}$ are arranged in the chessboard pattern, before performing the range estimation, the processor 13 further performs the pixel interpolation on the first image frame and the second image frame to fill interpolated data at positions in the first image frame and the second image frame corresponding to the second pixels $P_{mono}$ at first. Then, the range estimation is performed.

In the second embodiment, the processor 13 performs the VSLAM according to pixel data in the third image frame associated with the second pixels $P_{mono}$. In this embodiment, the third light source LS3 is not lighted (e.g., the third light source LS3 may be omitted). Since the pixel data generated by the first pixels $P_{IR}$ exclude components outside IR spectrum, the third image frame of this embodiment is formed by pixel data generated by the plurality of second pixels $P_{mono}$. In addition, before performing the VSLAM according to the third image frame, the processor 13 further performs the pixel interpolation on the third image frame so as to fill interpolated data at positions in the third image frame corresponding to the first pixels $P_{IR}$.

It is seen from FIG. 4 that a frame rate of the range estimation is increased to ¼ (e.g., a frame period including T1+T2+2× T3) of the sampling frequency of the optical sensor 11, and a frame rate of the VSLAM is increased to ½ of the sampling frequency of the optical sensor 11.

However, when ambient light is not enough, the processor 13 may not able to correctly perform the VSLAM without lighting the third light source LS3. To solve this problem, the processor 13 further identifies ambient light strength according to the third image frame, e.g. comparing with a brightness threshold. When identifying that the ambient light is weak, the processor 13 further changes the lighting timing of the first light source LS1 as well as the second light sources LS21 and LS22. For example, the processor 13 controls the lighting of light sources and the image capturing as shown in FIG. 2. That is, under strong ambient light (e.g., an average brightness of the third image frame larger than a brightness threshold), the mobile robot 100 operates using the timing of FIG. 4; whereas under weak ambient light (e.g., the average brightness of the third image frame smaller than the brightness threshold), the mobile robot 100 operates using the timing of FIG. 2.

The present disclosure further provides a mobile robot that performs the ranging estimation and obstacle recognition according to images captured by the same optical sensor 11. When identifying that one obstacle is a specific object, e.g., a wire or socks, the mobile robot 100 directly moves across the obstacle; whereas when identifying that one obstacle is an electronic device, e.g., a cell phone, the mobile robot 100 dodges the electronic device without moving across it. The obstacle that can be moved across is determined previously according to different applications.

The mobile robot 100 of this embodiment is also shown as FIGS. 1A and 1B including a first light source LS1, second light sources LS21 and LS22, a third light source LS3, an optical sensor 11 and a processor 13. For example referring to FIG. 4, the first light source LS1 projects a transverse light section toward the moving direction within a first time interval T1; the second light sources LS21 and LS22 respectively project a longitudinal light section toward the moving direction within a second time interval T2. The third light source LS3 is used to illuminate a front area of the moving direction.

As mentioned above, to cancel the interference from ambient light, the optical sensor 11 further captures a first dark image frame, for differencing with the first image frame, within a first dark interval (e.g., T3 in FIG. 4) of first light source prior to or behind the first time interval T1; and captures a second dark image frame, for differencing with the second image frame, within a second dark interval (e.g., T3 in FIG. 4) of second light source prior to or behind the second time interval T2. The optical sensor 11 respectively captures the first image frame and the second image frame within the first time interval T1 and the second time interval T2.

In this embodiment, the pixel array of the optical sensor 11 receives incident light via the light filter 15.

The processor 13 identifies an obstacle according to the first image frame and the second image frame, wherein the method of identifying the obstacle has been described above and thus details thereof are not repeated herein. After the obstacle is found, the processor 13 controls the third light source LS3 to light up within a third time interval (e.g., T3 in FIG. 2) and controls the optical sensor 11 to capture a third image frame within the third time interval.

In this embodiment, before appearance of the obstacle is identified by the processor 13, the third light source LS3 is not lighted up, and thus the operational timing of the mobile robot 100 is shown as FIG. 4. When identifying that any obstacle appears, the processor 13 controls the third light source LS3 to emit light and controls the optical sensor 11 to capture one third image frame during the third light source LS3 is emitting light. In other aspects, more than one third image frame may be captured. In the present disclosure, capturing one third image frame is taken as an example for illustration. In this embodiment, the third image frame is for the object recognition using a pre-trained learning model.

After receiving the third image frame from the optical sensor 11, the processor 13 determines a region of interest (ROI) in the third image frame according to a position of obstacle (i.e. the position of broken line), e.g., shown in FIGS. 6A and 6B. As the present disclosure uses a single optical sensor, after the processor 13 identifies a position of obstacle and determines the ROI according to the first image frame and the second image frame, the ROI directly maps to a corresponding region in the third image frame.

In one non-limiting aspect, the ROI has a predetermined image size. That is, when the position (e.g., center or gravity center, but not limited to) of one obstacle is determined, the processor 13 determines a region of interest having the predetermined size at the position.

In another aspect, a size of the ROI is determined by the processor 13 according to the first image frame and the second image frame. In this case, when the obstacle is larger, the ROI is larger; on the contrary, the ROI is smaller.

The processor 13 then recognizes an object type of the obstacle in the ROI using a pre-trained learning model (e.g., embedded in the processor 13 by means of ASIC or firmware). As the learning model does not recognize (e.g., not calculating convolution) rest region in the third image frame outside the ROI, the computation loading, time and power consumption are significantly reduced. Meanwhile, as the ROI contains a small number of object images, the recognition is not interfered by other object images to improve the recognition correctness.

In addition, to further improve the recognition correctness, the processor 13 further identifies a height of obstacle according to the second image frame, e.g., taking a length H of the broken line in FIG. 6B as the height of an obstacle. The learning model further recognizes the object type according to the object height.

In one aspect, the object height is used as the learning material by the data network architecture (e.g., including neural network learning algorithm, deep learning algorithm, but not limited to) together with the ground truth image in a training phase to generate the learning model.

In another aspect, in the training phase, the data network architecture only uses the ground truth image to generate the learning model. In operation, when the learning model calculates the probability of several possible objects, the height is used to filter some possible objects. For example, if the height of one object type categorized by the learning model exceeds the height identified according to the second image frame, even though this one object type has the highest probability, the learning model still excludes this object type.

The method of categorizing the object in an image by the learning model is known to the art, and thus details thereof are not described herein. Meanwhile, the incorporation between the learning model and the object height to recognize the obstacle is not limited to that described in the present disclosure.

In one aspect, as a capturing frequency of the optical sensor 11 is higher than a moving speed of the mobile robot 100, the processor 13 further controls the first light source LS1, the second light sources LS21 and LS22, and the third light source LS3 to turn off for a predetermined time interval after the third time interval T3 (i.e. after capturing one third image frame) till the obstacle leaves the projection range of the first light source LS1. In this way, it is able to prevent repeatedly recognizing the same obstacle. The predetermined time interval is determined according to, for example, the moving speed of the mobile robot 100 and the height determined according to the second image frame.

Figure 5:
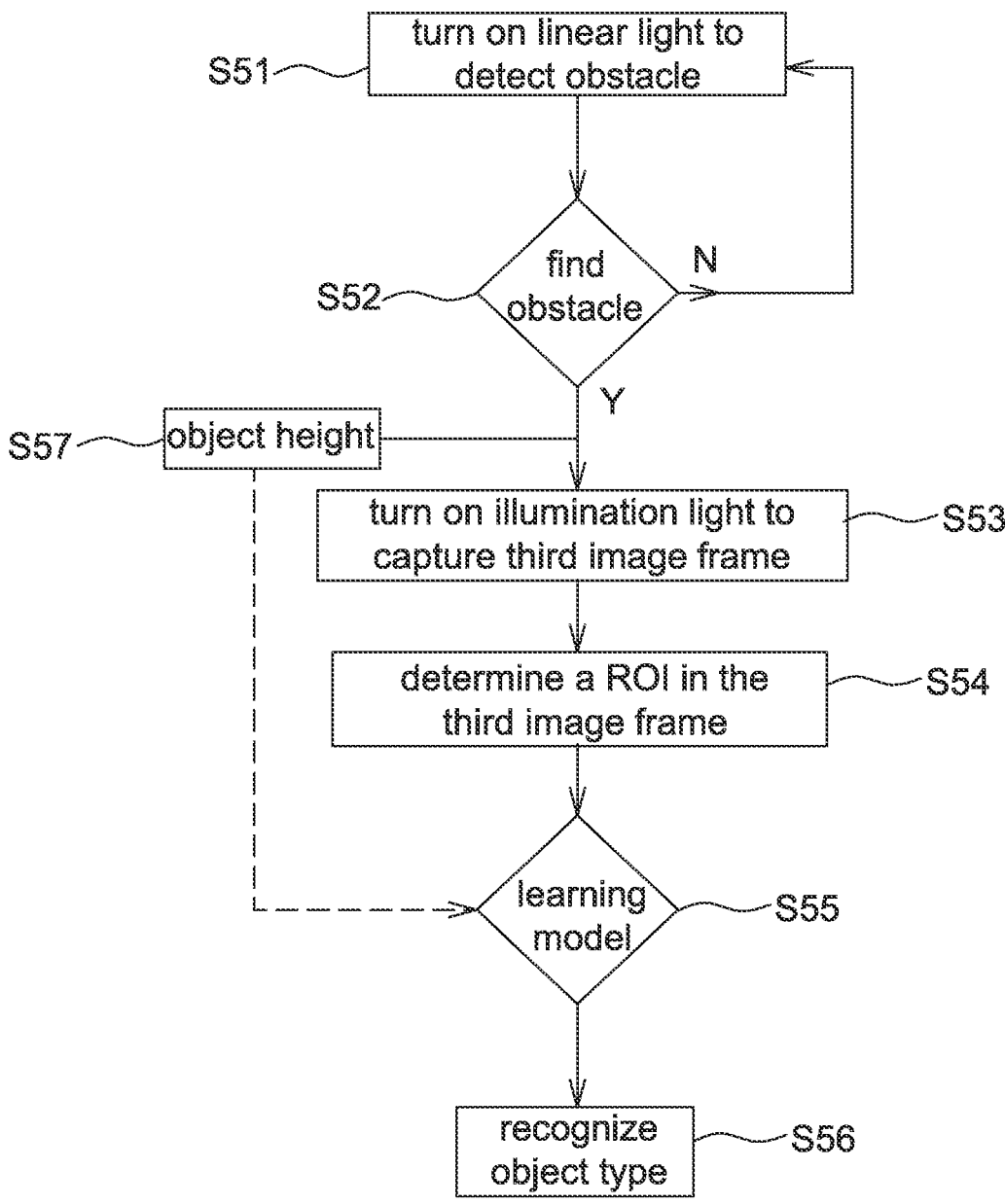
FIG. 5 is a flow chart of an operating method of a mobile robot according to a second embodiment of the present disclosure.

Referring to FIG. 5, it is a flow chart of an operating method of a mobile robot 100 according to one embodiment of the present disclosure, the method including the steps of: turning on linear light to detect an obstacle (Step S51); identifying whether an obstacle exists (Step S52); when there is no obstacle, moving back to Step S51 to continuous the detecting; whereas when there is one obstacle, turning on illumination light to capture a third image frame (Step S53); determining a region of interest (ROI) in the third image frame (Step S54); and using a learning model to recognize an object type (Steps S55-S56). This embodiment further includes an optional step: detecting an object height as an auxiliary in recognizing the object type (Step S57).

In this embodiment, the linear light includes, for example, the first light source LS1 as well as the second light source LS21 and LS22 mentioned above. The illumination light includes, for example, the third light source LS3 mentioned above. It is appreciated that positions of every light source shown in FIG. 1A is only intended to illustrate but not to limit the present disclosure.

Step S51: The processor 13 respectively controls the first light source LS1 as well as the second light source LS21 and LS22 to light up, for example, at the first time interval T1 and the second time interval T2 as shown in FIG. 4. Meanwhile, the processor 13 controls the optical sensor 11 to capture a first image frame and a second image frame respectively within the first time interval T1 and the second time interval T2.

Step S52: When identifying that the first image frame contains the broken line as shown in FIG. 6A or the second image frame contains the broken line as shown in FIG. 6B, the processor 13 identifies that there is an obstacle in front. The procedure then enters the Step S53; on the contrary, when the processor 13 identifies that both the first and second image frames do not contain any broken line, the Step S51 is entered to continuously detect an obstacle.

When identifying that the first image frame or the second image frame contains the broken line, the processor 13 further records (e.g., in the memory) a position of broken line as the object position.

Step S53: The processor 13 then controls the third light source LS3 to turn on, e.g., at the third time interval T3 shown in FIG. 2. The processor 13 also controls the optical sensor 11 to capture a third image frame, which contains at least one object image, within the third time interval T3. In an aspect that the processor 13 recognizes the object using a single image, the processor 13 controls the third light source LS3 to turn on for one third time interval V3. In one aspect, after the third time interval T3, the processor 13 controls the first light source LS1 as well as the second light sources LS21 and LS22 to operate using the timing shown in FIG. 4. In another aspect, after the third time interval T3, the processor 13 controls all light sources to turn off for a predetermined time interval to prevent detecting the same obstacle repeatedly and then operate using the timing shown in FIG. 4.

Step S54: The processor 13 then determines the ROI in the third image frame. The ROI is at the object position determined in the Step S52. As mentioned above, a size of the ROI is determined previously or determined according to a width W of the broken line in the first image frame (as shown in FIG. 6A) and a height H of the broken line in the second image frame (as shown in FIG. 6B).

Steps S55-S56: Finally, the processor 13 recognizes the object image within the ROI using the learning model trained before shipment to identify an object type.

Step S57: To increase the recognition correctness, when identifying an obstacle in the Step S52, the processor 13 further identifies an object height according to the second image frame, e.g., according to H in FIG. 6B. The identified object height helps the learning model to categorize and recognize the object type. The step S57 is selectively implemented.

After the object type is recognized, the processor 13 bypasses or dodges specific obstacles or directly moves across some obstacles according to previously determined rules. The operation after the object type being recognized is set according to different applications without particular limitations.

Figure 7:
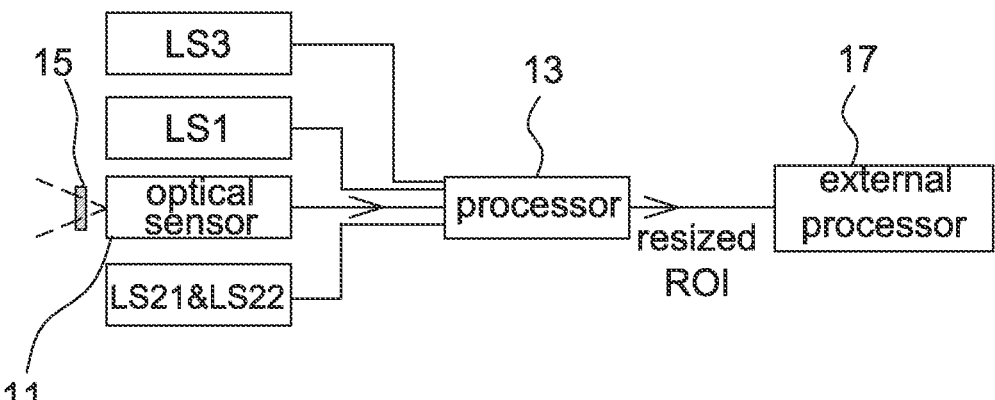
FIG. 7 is a schematic block diagram of a mobile robot according to an alternative embodiment of the present disclosure.

Please refer to FIG. 7, it is a schematic block diagram of a mobile robot according to an alternative embodiment of the present disclosure. The difference between embodiments of FIGS. 1B and 7 is that the embodiment of FIG. 7 further includes an external processor 17, and other components in FIG. 7 are identical to those of FIG. 1B.

Please refer to FIGS. 7 and 5 together, in this alternative embodiment, the processor 13 determines a region of interest (ROI), e.g., using FIGS. 6A and 6B, of an image frame (e.g., the third image frame mentioned above) captured by the optical sensor 11, and a pre-trained learning model is embedded in the external processor 17 outside the processor 13 since the image recognition by an AI engine needs more computing. In one aspect, the processor 13 is an application specific integrated sensor (ASIC) or a field programmable gate array (FPGA) of the optical sensor 13, and the external processor 17 is a central processing unit (CPU) or a micro control unit (MCU) of the mobile robot.

That is, the optical sensor 11 outputs pixel data of an image frame to the external processor 17 for the image recognition by a learning model embedded in the external processor 17. Generally, to obtain higher image recognition accuracy, the optical sensor 11 has a high resolution. If the whole image frame captured by the optical sensor 11 is transmitted to the external processor 17, it will lead to a lower report rate, higher computing power and higher false trigger since irrelevant pixel data (without containing object or obstacle information) is contained in the image frame. If it is possible to transmit pixel data only within the ROI to the external processor 17, a higher report rate, lower computing power and lower false trigger are obtainable since the processed data loading is lower and irrelevant pixel data is reduced. However, since the ROI is determined according to an object or obstacle image actually contained in the image frame, a size of the ROI is not fixed between image frames such that the ROI size is not suitable to an AI engine, which is embedded with a learning model for image recognition, only supporting fixed image size.

Accordingly, the present disclosure provides a mobile robot capable of generating a quantized ROI for the external processor 17 of the mobile robot to perform the image recognition. Said quantized ROI has a fixed size even though the ROI associated with the captured object or obstacle image is not fixed in successive image frames.

Figure 8:
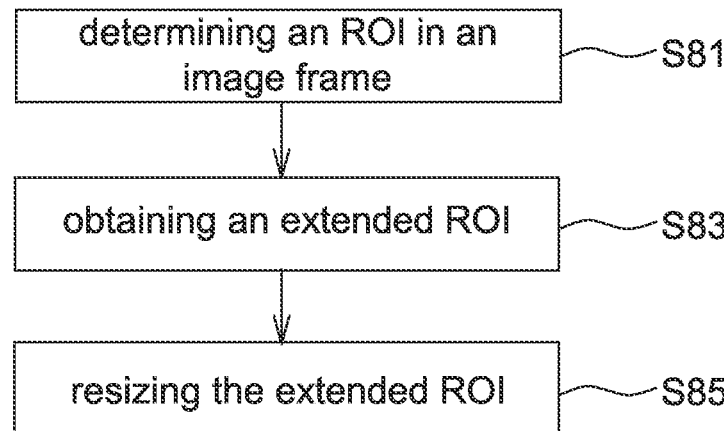
FIG. 8 is a flow chart of an operating method of a mobile robot according to an alternative embodiment of the present disclosure.

Please refer to FIG. 8, it is a flow chart of an operating method of a mobile robot according to an alternative embodiment of the present disclosure, including the steps of: determining a region of interest (ROI) in an image frame (Step S81); obtaining an extended ROI (Step S83); and resizing the extended ROI (Step S85).

Please refer to FIGS. 7 to 10B together, details of the operating method of this alternative embodiment are illustrated hereinafter.

Firstly, the optical sensor 11 captures image frames corresponding to, for example, lighting of different light sources as shown in FIG. 2. As mentioned above, a first light source LS1 projects a transverse light section toward a moving direction at a first time interval T1. Second light sources LS21 and LS22 respectively project a longitudinal light section toward the moving direction at a second time interval T2. A third light source LS3 illuminates a front area of the moving direction at a third time interval T3. The optical sensor 11 respectively captures a first image frame (e.g., IF1 shown in FIG. 9), a second image frame (e.g., IF2 shown in FIG. 9) and an image frame IF (e.g., the third image frame mentioned above) within the first time interval T1, the second time interval T2 and the third time interval T3. The processor 13 determines an ROI in the image frame IF according to at least one of the first image frame IF1 and the second image frame IF2. In one aspect, the operation of the multiple light sources are referred to FIG. 2. As mentioned above, the processor 13 may calculate a difference between bright-dark images to eliminate background noise.

As mentioned above, because the first image frame IF1, the second image frame IF2 and the image frame IF are captured by the same optical sensor 11, once an ROI is determined in the first image frame IF1 or the second image frame IF2, a corresponding region in the image frame IF is determined.

In one aspect, the mobile robot of the present disclosure includes only one of the first light source LS1 and the second light sources LS21 and LS22 such that the processor 13 determines the ROI according to one of the first image frame IF1 and the second image frame IF2.

In one aspect, the optical sensor includes a pixel array having a plurality of first pixels and a plurality of second pixels, and details thereof have been illustrated above, and thus are not repeated herein. The image capturing and the light sources activation are changed corresponding to ambient light, e.g., according to FIG. 2 or FIG. 4.

Figure 9:
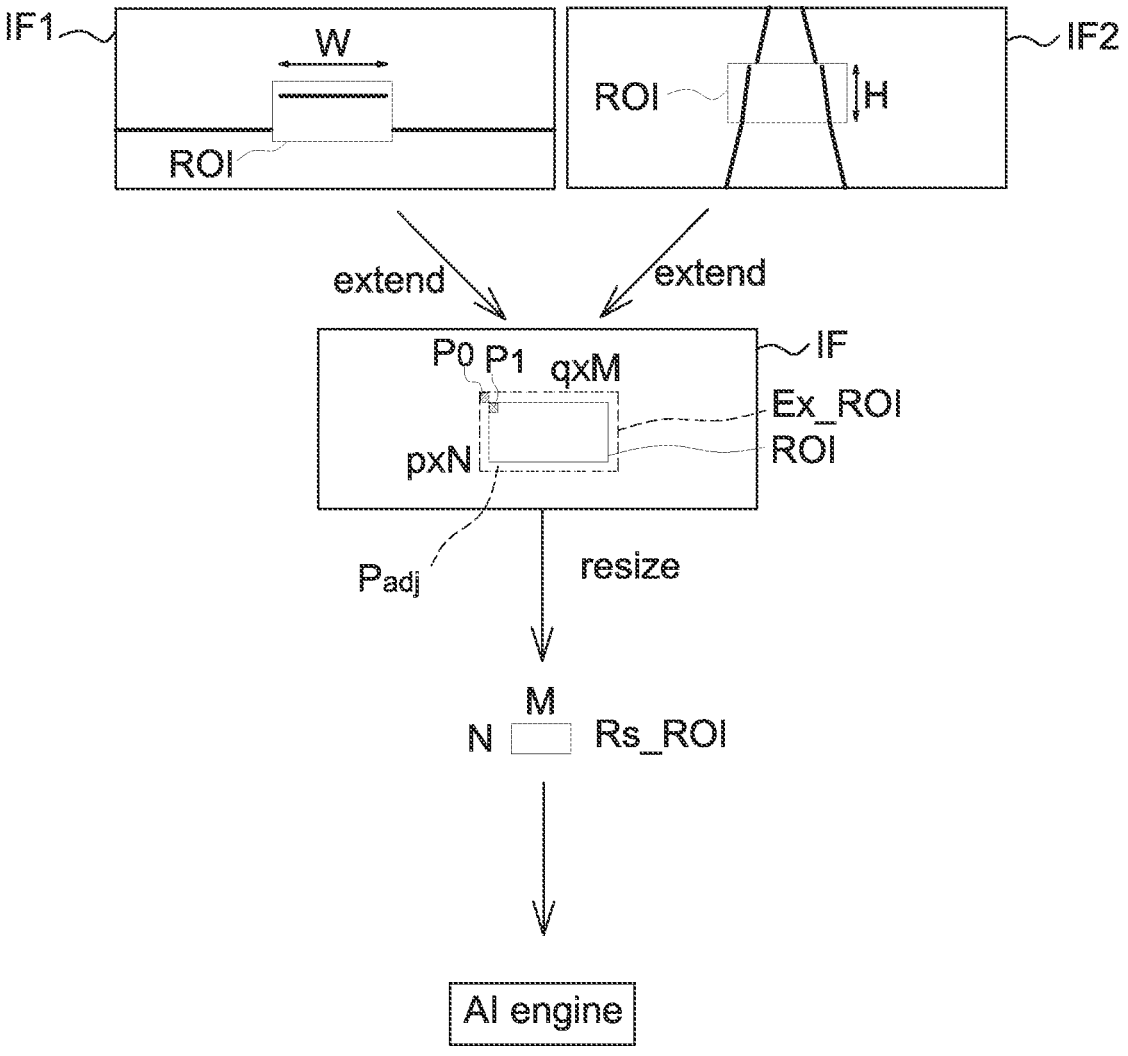
FIG. 9 is a schematic diagram of an operating method of a mobile robot according to an alternative embodiment of the present disclosure.

Step S81: As shown in FIG. 9, the processor 13 determines an ROI (e.g., a rectangle of solid line) in an image frame IF captured by the optical sensor 11. As a size of the ROI is determined according an actual object or obstacle image being captured, e.g., as shown in IF1 and/or IF2, the changed image size is not suitable to be processed by an AI engine, which is embedded with a training model, for processing an image of a fixed size, e.g., N×M mentioned below.

Step S83: Next, the processor 13 extends the size of the ROI from an edge of the ROI to an integer times of a predetermined size to obtain an extended ROI (e.g., a rectangle of dash line). For example, the processor 13 incorporates at least one of pixel rows (e.g., a region between the solid line and dash line adjacent to an upper side and a lower side of the ROI in FIG. 9) and pixel columns (e.g., a region between the solid line and dash line adjacent to a left side and a right side of the ROI in FIG. 9) adjacent to the ROI in the image frame IF with the ROI to obtain the extended ROI (shown as Ex_ROI). Therefore, the extended ROI is larger than the ROI.

For example, the predetermined size is N×M, which is a size of image to be inputted into an AI engine, and the integer times is (p×N)×(q×M), wherein p is identical to or different from q depending on the captured object or obstacle image. If one of a longitudinal size (e.g., in size-N direction) and a transverse size (e.g., in size-M direction) is not an integer times of the predetermined size N×M, the processor 13 extends the longitudinal size and/or the transverse size to respectively be equal to (p×N) and (q×M). Preferably, values of p and q are selected as small as possible. If it is possible (the ROI being extended by an even number of pixels), the processor 13 incorporates a same number of pixel rows adjacent to two opposite sides (e.g., upper and lower sides) of the ROI with the ROI to obtain the extended ROI, and incorporates a same number of pixel columns adjacent to two opposite sides (e.g., left and right sides) of the ROI with the ROI to obtain the extended ROI.

In the scenario that when one side of the ROI is at an edge of the image frame IF, the processor 13 incorporates the pixel rows or the pixel columns only adjacent to a side of the ROI opposite to the one side with the ROI to obtain the extended ROI.

Figure 10A:
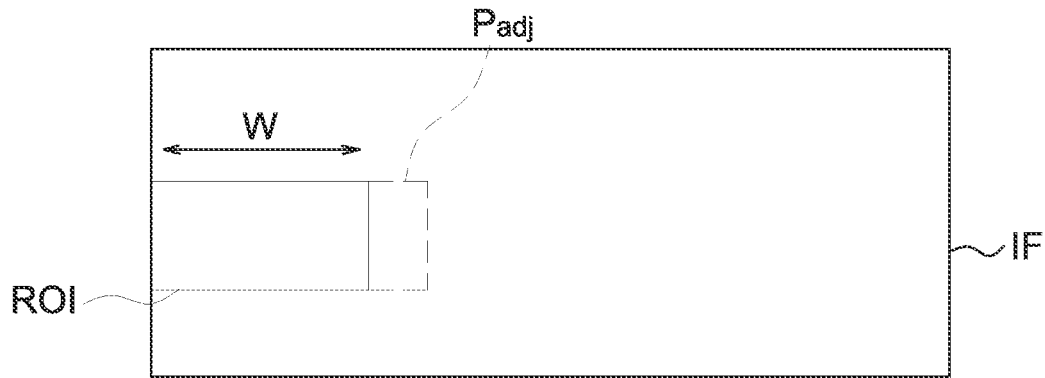
FIGS. 10A-10B are schematic diagrams of obtaining an extended ROI by a mobile robot according to an alternative embodiment of the present disclosure.

For example, FIG. 10A shows that a left side of the ROI is at a left edge of the image frame IF, the processor 13 only incorporates pixel rows $P_{adj}$ adjacent to a right side of the ROI with the ROI to obtain the extended ROI. Similarly, when a right side of the ROI is at a right edge of the image frame IF, the processor 13 only incorporates pixel rows $P_{adj}$ adjacent to a left side of the ROI with the ROI to obtain the extended ROI.

Figure 10B:
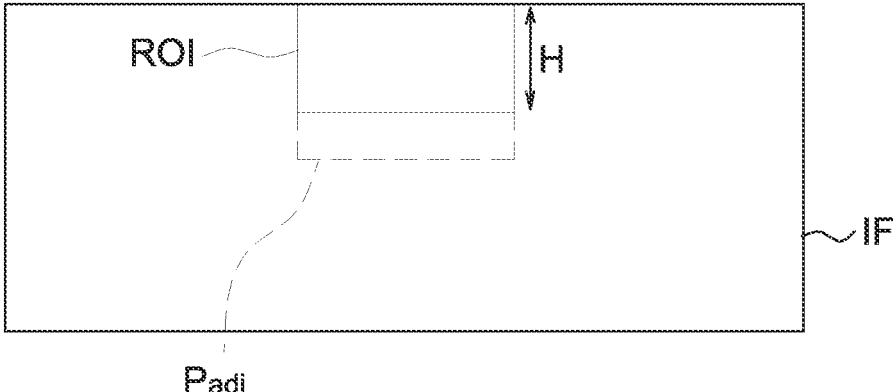

For example, FIG. 10B shows that an upper side of the ROI is at an upper edge of the image frame IF, the processor 13 only incorporates pixel rows $P_{adj}$ adjacent to a lower side of the ROI with the ROI to obtain the extended ROI. Similarly, when a lower side of the ROI is at a lower edge of the image frame IF, the processor 13 only incorporates pixel rows $P_{adj}$ adjacent to an upper side of the ROI with the ROI to obtain the extended ROI.

Similarly, when two sides of the ROI are at two edges of the image frame IF, the incorporated pixel rows and pixel columns are adjacent to the rest two sides of the ROI close to a center of the image frame IF.

However, if the processor 13 identifies that the size of ROI is just equal to an integer times of the predetermined size N×M, the ROI is not extended, and the process moves to S85. That is, the extended ROI is the ROI.

Step S85: Finally, the processor 13 resizes (or downsizes) the extended ROI, with a size (p×N)×(q×M), to the predetermined size N×M, wherein p and q are positive integers. For example, the processor 13 samples one pixel every p pixels in an N-size direction (e.g., a longitudinal direction in FIG. 9), and samples one pixel every q pixels in an M-size direction (e.g., a transverse direction in FIG. 9) in resizing the extended ROI.

In one aspect, the processor 13 samples the one pixel (either in the longitudinal direction or the transverse direction) from a first pixel, e.g., P1 shown in FIG. 9, of the ROI since it is known that the incorporated pixels in Step S83 do not contain information of an object or obstacle. In another aspect, the processor 13 samples the one pixel from a first pixel, e.g., P0 shown in FIG. 9, of the extended ROI.

A number of pixels equidistantly sampled in the longitudinal direction is N, and a number of pixels equidistantly sampled in the transverse direction is M. In this way, the ROI is firstly extended and then downsized before being inputted into the AI engine, which is embedded with a model previously trained to recognize images of predetermined objects or obstacles.

It should be mentioned that although the above embodiment is described in the way that the optical sensor 13 outputs a resized ROI to the external processor 17, the present disclosure is not limited thereto. In another aspect, the processor 13 outputs the extended ROI to the external processor 17, and the external processor 17 firstly resizes the received extended ROI to obtain a resized ROI, with the predetermined size N×M, and then the resized ROI is inputted into an AI engine therein. In this way, since the a size of the extended ROI is generally smaller than the image frame IF, the computing loading is still reduced.

In another aspect, the processor 13 does not extend the ROI but directly resizes the ROI, i.e. not performing S83 of FIG. 8.

In this aspect, after the processor 13 determines a ROI in the image frame IF, the processor 13 calculates a ratio of a size of the ROI with respect to a predetermined size N×M, which is smaller than the size of the ROI. The ratio is used to determine how many pixels in the ROI need to be sampled so as to resize the ROI to the predetermined size N×M.

For example, when the predetermined size is N×M, a first ratio in an N-size direction is p, a second ratio in an M-size direction is q, wherein p and q are selected as integers. More specifically, if the calculated ratio is not an integer, the processor 13 directly omits the decimal part to obtain p and q. For example, if a height of the ROI is 3.2 time of N, then p is selected as 3; and if a width of the ROI is 4.7 time of M, then q is selected as 4. In one aspect, the processor 13 samples one pixel every p pixels in the N-size direction, and samples one pixel every q pixels in the M-size direction. In another aspect, the processor 13 samples one pixel every (p+1) pixels in the N-size direction, and samples one pixel every (q+1) pixels in the M-size direction.

A number of pixels sampled in the longitudinal direction is N, and a number of pixels sampled in the transverse direction is M. In this way, it is also possible to obtain a size-fixed image to be inputted into the AI engine even though the ROI determined according to the captured object or obstacle image is not fixed. As mentioned above, the processor 13 is selected to stop calculate the ROI within a predetermined after a previous ROI is determined.

It should be mentioned that although the above embodiments are illustrated in the way that a ROI is determined according to whether there is a broken part in a transverse light section and/or a longitudinal light section, the present disclosure is not limited thereto. In another aspect, the ROI is determined according to an image frame captured by the optical sensor 11 when the illumination light source (e.g., the third light source) is lighting, and the ROI is determine according to pixels having a gray level larger than a threshold.

Although the above embodiment is illustrated in the way that an AI engine is embedded in a different processor from the processor for determining the quantized ROI (i.e. resized ROI), the present disclosure is not limited thereto. In another aspect, the AI engine is embedded in the same processor with the processor for determining the quantized ROI. The two processors shown in FIG. 7 are both arranged in the mobile robot.

The present disclosure further provides a mobile robot (e.g., 100 shown in FIG. 1A) that performs the range estimation as well as VSLAM and/or image recognition using image frames captured by the same optical sensor (e.g., 11 shown in FIGS. 1A and 1B).

The mobile robot 100 in this embodiment includes a linear light source, an optical sensor 11, a dual-bandpass filter and a processor 13. Details of the optical sensor 11 and the processor 13 have been illustrated above, and thus are not repeated herein.

The linear light source is selected from at least one of the first light source LS1 and the second light sources LS21 and LS22 mentioned above. That is, the linear light source projects a transverse light section toward a moving direction of the mobile robot 100 when the first light source LS1 is used; and the linear light source projects longitudinal light sections toward the moving direction of the mobile robot 100 when the second light sources LS21 and LS22 are used. More specifically, the linear light source of this embodiment projects a linear light section, including at least one of a transverse light section and a longitudinal light section, toward the moving direction.

Figure 13A:
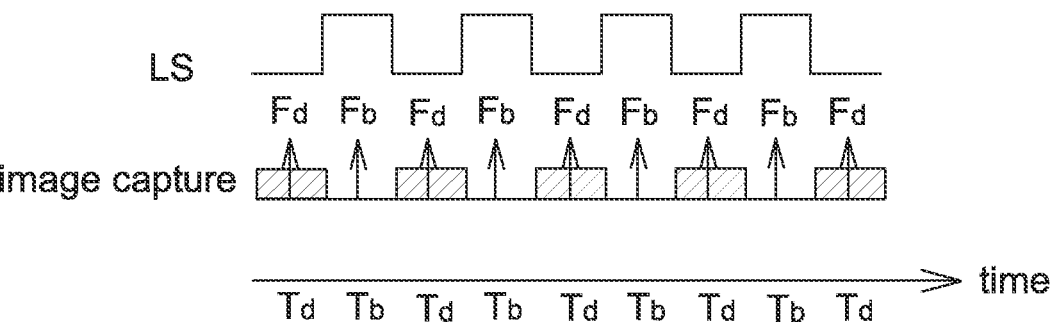
FIGS. 13A-13B are operational timing diagrams of a mobile robot according to an alternative embodiment of the present disclosure.

Please refer to FIG. 13A, the optical sensor 11 captures a bright image frame Fb when the linear light source is turned on, and captures a dark image frame Fd when the linear light source is turned off. In FIG. 13A, LS indicates lighting of the linear light source, Td indicates an interval during which the linear light source is turned off, and Tb indicates an interval during which the linear light source is turned on.

Figure 13B:
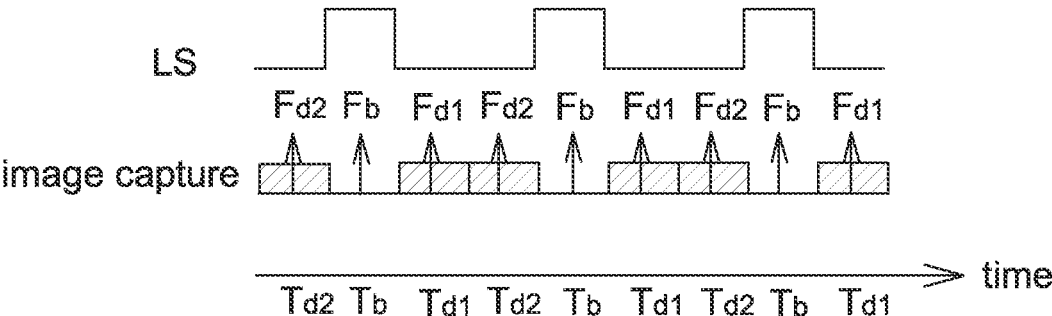

Please refer to FIG. 13B, the optical sensor 11 captures a bright image frame Fb when the linear light source is turned on, and captures a dark image frame Fd1 and Fd2, respectively, when the linear light source is turned off. In FIG. 13B, LS indicates lighting of the linear light source, Td1 and Td2 indicate intervals during which the linear light source is turned off, and Tb indicates an interval during which the linear light source is turned on.

Figure 11A:
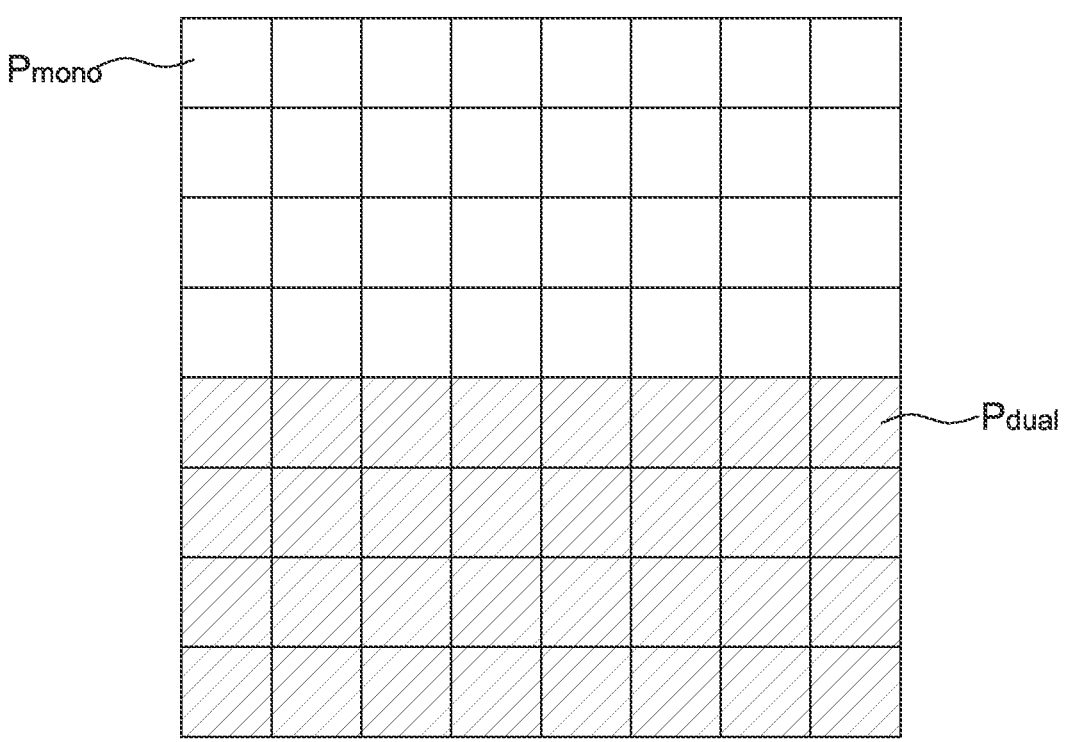
FIGS. 11A-11B are schematic diagrams of a dual-bandpass filter arranged corresponding to a pixel array according to an alternative embodiment of the present disclosure.
Figure 12:
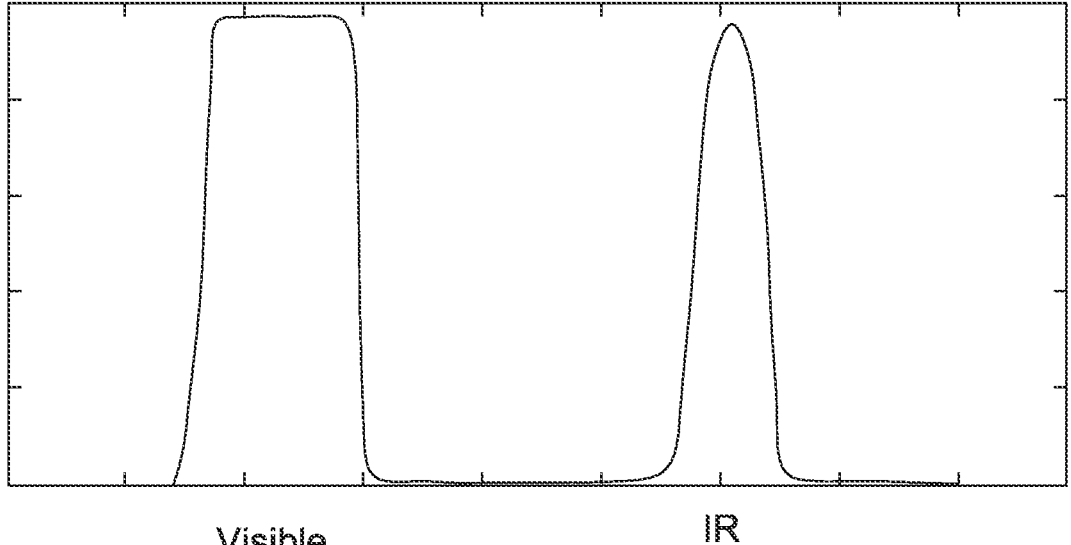
FIG. 12 is a schematic diagram of spectrum of the pass band of the dual-bandpass filter in FIGS. 11A-11B.

In this embodiment, the mobile robot 100 further includes a dual-bandpass filter arranged at a light incident path of the optical sensor 11. More specifically, the dual-bandpass filter is coated on a lens (e.g., 15 shown in FIG. 1B and FIG. 7) arranged at a light incident path of the optical sensor 11 or directly coated on the pixel array. The dual-bandpass filter is arranged at a part of or all of the light incident path of the optical sensor 11. For example, FIG. 11A shows that the dual-bandpass filter is arranged at a lower part of the light incident path of the optical sensor 11 such that pixels (shown as $P_{dual}$) covered or overlapped by the dual-bandpass filter (shown by tilt lines) receive light energy passing the dual-bandpass filter. In this embodiment, the dual-bandpass filter is an IR and visible light pass filter. FIG. 12 shows spectrum of the pass band of the dual-bandpass filter.

In the present disclosure, pixels that are covered or overlapped by the dual-bandpass filter are determined according to a region of the pixel array used to capture an image of the linear light section. That is, if a region of the pixel array used to capture the image of the linear light section is at an upper part or a central part of the pixel array, pixels that are covered or overlapped by the dual-bandpass filter are at an upper part or a central part of the pixel array. In another aspect, if the second light source LS21 and/or LS22 is user, pixels that are covered or overlapped by the dual-bandpass filter are at a longitudinal region of the pixel array.

As mentioned above, in one aspect, pixels $P_{mono}$ are not covered by any filter.

Figure 11B:
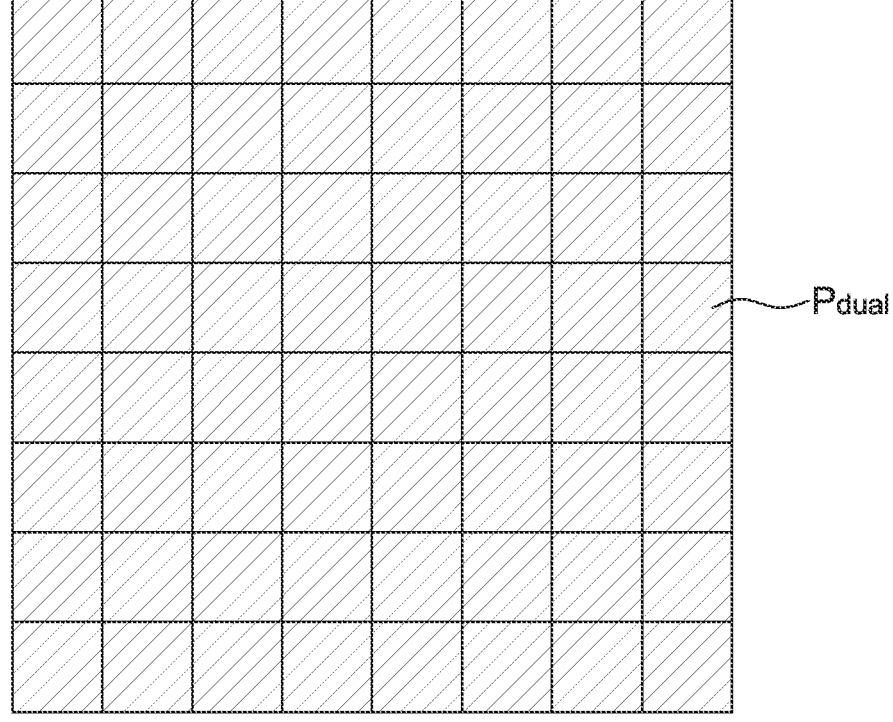

FIG. 11B shows that all pixels of the pixel array are covered or overlapped by the dual-bandpass filter such that all pixels $P_{dual}$ receive light energy passing the dual-bandpass filter.

The processor 13 is electronically coupled to the linear light source and the optical sensor 11 to control the lighting of the linear light source and control the image capturing of the optical sensor 11, e.g., as shown in FIGS. 13A and 13B. The processor 13 calculates a differential image frame between the bright image frame Fb and dark image frame Fd (e.g., calculating Fb-Fd pixel-by-pixel), performs range estimation using the differential image frame (Fb-Fd); and performs visual simultaneous localization and mapping (VSLAM) or image recognition using the dark image frame Fd or another dark image frame Fd2 captured by the optical sensor 11.

For example, in the aspect of FIG. 13A, the mobile robot 100 includes two frame buffers. One of the two frame buffers stores the differential image frame (Fb-Fd) between the bright image frame Fb and dark image frame Fd; and the other one of the two frame buffers stores the dark image frame Fd. The processor 13 performs the range estimation using the differential image frame (Fb-Fd); and performs the VSLAM or image recognition using the dark image frame Fd.

For example, in the aspect of FIG. 13B, the mobile robot 100 includes one frame buffer. The one frame buffer alternatively stores the differential image frame (Fb-Fd1) and the dark image frame Fd2. The differential image frame is used to cancel out the ambient light interference. The processor 13 performs the range estimation using the differential image frame (Fb-Fd1); and performs the VSLAM or image recognition using the dark image frame Fd2. It is also possible to employ two frame buffers in the case of FIG. 13B.

In one aspect, the mobile robot 100 does not include the third light source LS3. That is, the processor 13 performs the VSLAM or image recognition only when the dark image frame has enough brightness (e.g., higher than a threshold). In another aspect, the mobile robot 100 includes a third light source LS3, which is turned on corresponding to intervals Td2 of FIG. 13B such that the VSLAM and the image recognition are also performed when the ambient light is weak. The "dark" image means an image frame being captured upon the linear light source being turned off.

In the aspect of FIG. 11B, the processor 13 performs the range estimation using the whole differential image frame and performs the VSLAM or image recognition using the whole dark image frame Fd or Fd2.

In the aspect of FIG. 11A, the processor 13 performs the range estimation using a region of interest (e.g., filled with tilt lines) of the pixel array covered or overlapped by the dual-bandpass filter since the linear light section image appears in a part of the whole bright image frame Fb such that the calculation loading is reduced. In one aspect, pixel data outside the region of interest is not used in identifying the existence of an obstacle and calculating an obstacle distance. The processor 13 performs the VSLAM or image recognition using the whole dark image frame Fd or Fd2.

Details of performing the range estimation, VSLAM and image recognition have been illustrated above, and thus are not repeated again.

In an alternative embodiment of the present disclosure, in the image recognition, the processor 13 or 17 recognizes a code indicated by a Tag. In the present disclosure, the Tag is an AprilTag or a vendor defined Tag, The AprilTag has good invariance at different rotation angles and different image sizes. The AprilTag can be printed by a user without purchasing additionally.

The mobile robot (e.g., 100 shown in FIG. 1A) of the present disclosure further includes a memory (including volatile memory and/or non-volatile memory) previously stores information of different Tags. The processor 13 or 17 controls the mobile robot 100 to perform different operations corresponding to different Tags. It is appreciated that the mobile robot 100 is embedded with or able to download from internet or storage medium an algorithm and/or associated codes for recognizing different Tags.

In one aspect, the Tag is used as a virtual wall such that the processor 13 or 17 controls the mobile robot 100 to change a moving direction thereof when a predetermined Tag is recognized. Furthermore, the processor 13 or 17 controls the mobile robot 100 to change the moving direction thereof at different distances from the Tag. For example, when a first Tag (or first code) is recognized by the processor 13 or 17, the processor 13 or 17 controls the mobile robot 100 to change the moving direction thereof at 10 cm, but not limited to, from the Tag; and when a second Tag (or second code) is recognized by the processor 13 or 17, the processor 13 or 17 controls the mobile robot 100 to change the moving direction thereof at 5 cm, but not limited to, from the Tag.

In another aspect, the Tag is used as a virtual mark such that the processor 13 or 17 controls the mobile robot 100 to operate in a different mode when a predetermined Tag is recognized. For example, when a third Tag (or third code) is recognized by the processor 13 or 17, the processor 13 or 17 controls the mobile robot 100 to change the suction power, to change illumination light and/or start to spray liquid on the working surface, e.g., the third Tag indicating a different surface behind the Tag. In this aspect, the processor 13 or 17 controls the mobile robot 100 not to change a moving direction thereof and to directly move across the Tag. It is possible to arranged different operations corresponding to different Tags. The information associated with the first, second and third code are previously recorded in the memory.

Figure 14:
FIG. 14 is schematic diagram of an image frame captured by an optical sensor of a mobile robot according to an alternative embodiment of the present disclosure.

Please refer to FIG. 14, it is a schematic diagram of an image frame IF captured by the optical sensor 11 via the dual-bandpass filter as shown in FIG. 11A or 11B when the linear light source is turned off. The memory further records a distance of a ground line, which is corresponding to a linear light section image of a transverse light section projected by the linear light source.

To reduce the computation loading, in one aspect the processor 13 or 17 recognizes the Tag only when a tag image appears closer than the distance of the ground line. In one aspect, it is pre-set a window of interest (WOI) in the image frame IF below the ground line in the image frame IF, and the processor 13 or 17 recognizes the Tag only when a tag image thereof appears within the WOI, i.e. below dashed line in the image frame IF. In another aspect, the processor 13 or 17 calculates a distance (e.g., a number of pixels) H' between the ground line (e.g., previously recorded in the memory) and the tag image so as to determine a distance or depth (in actual space) from the Tag according to H'. For example, the memory further previously records a relationship between H' and depths of the Tag calculated using triangulation. The processor 13 or 17 is arranged to control the mobile robot 100 to perform a predetermined operation when a predetermined distance or depth is reached, e.g., changing direction or operation mode as mentioned above.

It should be mentioned that although the above embodiments are described in the way that the second light sources LS21 and LS22 are turned on and off together, the present disclosure is not limited thereto. In other aspects, LS21 and LS22 are turned on sequentially (and optical sensor capturing images correspondingly) as long as LS21 and LS22 respectively project a longitudinal light section toward the moving direction.

In addition, a number of first light source, the second light source and the third light source is not limited to those shown in FIG. 1A. The first light source, the second light source and the third light source may respectively include multiple light sources to turn on and off simultaneously.

In the present disclosure, the "transverse" is referred to substantially parallel to a moving surface (e.g., the ground), and the "longitudinal" is referred to substantially perpendicular to the moving surface. The object on the moving path is called the obstacle.

As mentioned above, the conventional cleaning robot adopts multiple types of sensors to respectively implement different detecting functions, and has the issues of high computation loading, time and consumption power as well as low recognition correctness. Accordingly, the present disclosure further provides a mobile robot suitable to recognize objects or obstacles using an AI engine supporting a fixed image frame (e.g. FIG. 9). The present disclosure further provides a mobile robot incorporating a dual-bandpass filter.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A mobile robot, comprising:
an optical sensor, configured to capture an image frame; and
a processor, electrically coupled to the optical sensor, and configured to
determine a region of interest (ROI) in the image frame,
extend a size of the ROI from an edge of the ROI to an integer times of a predetermined size to obtain an extended ROI, and
resize the extended ROI to the predetermined size,
wherein the processor is configured to incorporate at least one of pixel rows and pixel columns adjacent to the ROI in the image frame with the ROI to obtain the extended ROI.

2. The mobile robot as claimed in claim 1, further comprising:
a first light source, configured to project a transverse light section toward a moving direction at a first time interval;
a second light source, configured to project a longitudinal light section toward the moving direction at a second time interval; and
a third light source, configured to illuminate a front area of the moving direction at a third time interval, wherein
the optical sensor is configured to respectively capture a first image frame, a second image frame and the image frame within the first time interval, the second time interval and the third time interval, and
the processor is configured to determine the ROI in the image frame according to at least one of the first image frame and the second image frame.

3. The mobile robot as claimed in claim 2, wherein the optical sensor comprises a pixel array comprising a plurality of first pixels and a plurality of second pixels, the plurality of first pixels is configured to receive incident light via an IR light filter, and the plurality of second pixels is configured to receive incident light without via any light filter, wherein
the first image frame and the second image frame are formed by pixel data generated by the plurality of first pixels; and the third image frame is generated by pixel data generated by both the plurality of first pixels and the plurality of second pixels.

4. The mobile robot as claimed in claim 3, wherein the plurality of first pixels and the plurality of second pixels are arranged in a chessboard pattern.

5. The mobile robot as claimed in claim 1, wherein upon one side of the ROI being at an edge of the image frame, the processor is configured to incorporate the pixel rows or the pixel columns only adjacent to a side of the ROI opposite to the one side with the ROI to obtain the extended ROI.

6. The mobile robot as claimed in claim 1, wherein the processor is configured to incorporate a same number of pixel rows adjacent to two opposite first sides of the ROI with the ROI to obtain the extended ROI, and incorporate a same number of pixel columns adjacent to two opposite second sides of the ROI with the ROI to obtain the extended ROI.

7. The mobile robot as claimed in claim 1, wherein the predetermined size is N×M, the integer times is (p×N)×(q×M), wherein p is identical to or different from q, and the processor is configured to sample one pixel every p pixels in an N-size direction, and sample one pixel every q pixels in an M-size direction in resizing the extended ROI.

8. The mobile robot as claimed in claim 7, wherein the processor is configured to sample the one pixel from a first pixel of the ROI.

9. The mobile robot as claimed in claim 7, wherein the processor is configured to sample the one pixel from a first pixel of the extended ROI.

10. A mobile robot, comprising:

an optical sensor, configured to capture an image frame; and a processor, electrically coupled to the optical sensor, and configured to determine a region of interest (ROI) in the image frame, extend a size of the ROI from an edge of the ROI to an integer times of a predetermined size to obtain an extended ROI, and incorporate at least one of pixel rows and pixel columns adjacent to the ROI in the image frame with the ROI to obtain the extended ROI.

11. The mobile robot as claimed in claim 10, further comprising:

a first light source, configured to project a transverse light section toward a moving direction at a first time interval;

a second light source, configured to project a longitudinal light section toward the moving direction at a second time interval; and a third light source, configured to illuminate a front area of the moving direction at a third time interval, wherein the optical sensor is configured to respectively capture a first image frame, a second image frame and the image frame within the first time interval, the second time interval and the third time interval, and the processor is configured to determine the ROI in the image frame according to at least one of the first image frame and the second image frame.

12. The mobile robot as claimed in claim 11, wherein the optical sensor comprises a pixel array comprising a plurality of first pixels and a plurality of second pixels, the plurality of first pixels is configured to receive incident light via an IR light filter, and the plurality of second pixels is configured to receive incident light without via any light filter, wherein the first image frame and the second image frame are formed by pixel data generated by the plurality of first pixels; and the third image frame is generated by pixel data generated by both the plurality of first pixels and the plurality of second pixels.

13. The mobile robot as claimed in claim 12, wherein the plurality of first pixels and the plurality of second pixels are arranged in a chessboard pattern.

14. The mobile robot as claimed in claim 10, wherein upon one side of the ROI being at an edge of the image frame, the processor is configured to incorporate the pixel rows or the pixel columns only adjacent to a side of the ROI opposite to the one side with the ROI to obtain the extended ROI.

15. The mobile robot as claimed in claim 10, wherein the processor is configured to incorporate a same number of pixel rows adjacent to two opposite first sides of the ROI with the ROI to obtain the extended ROI, and incorporate a same number of pixel columns adjacent to two opposite second sides of the ROI with the ROI to obtain the extended ROI.

16. A mobile robot, comprising:

an optical sensor, configured to capture an image frame; and a processor, electrically coupled to the optical sensor, and configured to determine a region of interest (ROI) in the image frame, calculate a ratio of a size of the ROI with respect to a predetermined size which is smaller than the size of the ROI, and sample the ROI to resize the ROI to the predetermined size, wherein the predetermined size is N×M, a first ratio in an N-size direction is an integer p, a second ratio in an M-size direction is an integer q, and the processor is configured to sample one pixel every p pixels in the N-size direction, and sample one pixel every q pixels in the M-size direction.

17. The mobile robot as claimed in claim 16, further comprising:

a first light source, configured to project a transverse light section toward a moving direction at a first time interval; and a third light source, configured to illuminate a front area of the moving direction at a third time interval, wherein the optical sensor is configured to respectively capture a first image frame and the image frame within the first time interval and the third time interval, and the processor is configured to determine the ROI in the image frame according to the first image frame.

18. The mobile robot as claimed in claim 17, further comprising:

a second light source, configured to project a longitudinal light section toward the moving direction at a second time interval, wherein the optical sensor is configured to respectively capture a second image frame and the image frame within the second time interval and the third time interval, and the processor is configured to determine the ROI in the image frame according to the second image frame.

19. A mobile robot, comprising:

a linear light source, configured to project a linear light section toward a moving direction of the mobile robot;

an optical sensor, configured to capture a bright image frame upon the linear light source being turned on and a dark image frame upon the linear light source being turned off;

a dual-bandpass filter, arranged at a light incident path of the optical sensor; and a processor, electronically coupled to the linear light source and the optical sensor, and configured to calculate a differential image frame between the bright image frame and dark image frame, perform range estimation using the differential image frame; and perform visual simultaneous localization and mapping (VSLAM) or image recognition using the dark image frame or another dark image frame captured by the optical sensor.

20. The mobile robot as claimed in claim 19, wherein the linear light source is configured to project a transverse light section or a longitudinal light section.

21. The mobile robot as claimed in claim 19, wherein the dual-bandpass filter is an IR and visible light pass filter.

22. The mobile robot as claimed in claim 19, wherein the dual-bandpass filter is arranged at a part of or all of the light incident path of the optical sensor.

23. The mobile robot as claimed in claim 19, wherein in the image recognition, the processor is configured to recognize a vendor defined Tag as a virtual wall.

24. The mobile robot as claimed in claim 23, further comprising a memory configured to record a distance of a ground line corresponding to a transverse light section projected by the linear light source, wherein the processor is further configured to recognize the vendor defined Tag only closer than the distance of the ground line.

25. The mobile robot as claimed in claim 23, wherein the processor is further configured to control the mobile robot to perform different operations corresponding to different vendor defined Tags.

* * * * *